(12) United States Patent
Wang

(10) Patent No.: US 10,098,016 B2
(45) Date of Patent: Oct. 9, 2018

(54) ADAPTIVE SCANNING WITH MULTI-RADIO DEVICE

(71) Applicant: QUALCOMM Incorporated, San Diego, CA (US)

(72) Inventor: Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/603,234

(22) Filed: Jan. 22, 2015

(65) Prior Publication Data

US 2016/0219440 A1 Jul. 28, 2016

(51) Int. Cl.
*H04W 24/02* (2009.01)
*H04W 48/16* (2009.01)
*H04W 88/06* (2009.01)
*H04W 24/08* (2009.01)
*H04W 84/04* (2009.01)
*H04W 84/12* (2009.01)

(52) U.S. Cl.
CPC ........... *H04W 24/02* (2013.01); *H04W 48/16* (2013.01); *H04W 88/06* (2013.01); *H04W 24/08* (2013.01); *H04W 84/042* (2013.01); *H04W 84/12* (2013.01)

(58) Field of Classification Search
CPC ..... H04W 24/02; H04W 24/08; H04W 48/16; H04W 88/06
See application file for complete search history.

(56) References Cited

U.S. PATENT DOCUMENTS

| 8,254,332 | B2 | 8/2012 | Bertorelle et al. |
| 2008/0233955 | A1 | 9/2008 | Narang et al. |
| 2009/0180451 | A1 | 7/2009 | Alpert et al. |
| 2009/0213804 | A1 | 8/2009 | Yoon et al. |
| 2009/0280802 | A1 | 11/2009 | Chin et al. |
| 2009/0296652 | A1* | 12/2009 | Rudowicz ............. H04W 48/16 370/331 |
| 2013/0083712 | A1 | 4/2013 | Sadek et al. |
| 2013/0273916 | A1* | 10/2013 | Gupta ................... H04W 36/34 455/436 |
| 2014/0003259 | A1 | 1/2014 | Chin et al. |
| 2014/0192692 | A1 | 7/2014 | Stark et al. |
| 2014/0341069 | A1* | 11/2014 | Alon ..................... H04W 48/16 370/254 |

(Continued)

FOREIGN PATENT DOCUMENTS

| EP | 2364049 A1 | 9/2011 |
| EP | 2712239 A1 | 3/2014 |

OTHER PUBLICATIONS

ISA/EPO, International Search Report and Written Opinion of the International Searching Authority, Int'l Appl. No. PCT/US2015/066261, dated Mar. 14, 2016, European Patent Office, Rijswijk, NL, 17 pgs.

*Primary Examiner* — Un C Cho
*Assistant Examiner* — Jeremy M Costin
(74) *Attorney, Agent, or Firm* — Holland & Hart LLP

(57) ABSTRACT

Methods, systems, and devices are described for adaptive scanning with a multi-radio device. A mobile device may monitor the signal quality of an established communication associated with a first radio (e.g., Long Term Evolution (LTE) radio) to dynamically adapt the measurement activity (e.g., scanning periodicity) of a second radio (e.g., wireless local area network (WLAN) radio) to minimize data transmission interruption.

26 Claims, 11 Drawing Sheets

(56) References Cited

U.S. PATENT DOCUMENTS

| | | | | |
|---|---|---|---|---|
| 2015/0312830 A1* | 10/2015 | Xu | ........................ | H04W 36/30 |
| | | | | 370/331 |
| 2015/0334584 A1* | 11/2015 | Sun | ....................... | H04W 24/02 |
| | | | | 455/67.11 |
| 2016/0050605 A1* | 2/2016 | Kim | ..................... | H04W 28/08 |
| | | | | 370/331 |
| 2016/0135144 A1* | 5/2016 | Tsai | ...................... | H04W 72/02 |
| | | | | 455/553.1 |
| 2016/0165604 A1* | 6/2016 | Khawer | ................ | H04W 16/14 |
| | | | | 455/452.1 |

* cited by examiner

ADAPTIVE SCANNING WITH MULTI-RADIO DEVICE

BACKGROUND

Field of Disclosure

The following relates generally to wireless communication, and more specifically to adaptive scanning with a multi-radio device.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power).

A wireless network, for example a wireless local area network (WLAN), such as a network operating according to one of the Institute of Electrical and Electronics Engineers (IEEE) 802.11 family of standards ("Wi-Fi"), may include an access point (AP) that may communicate with one or more station (STAs) or mobile devices. The AP may be coupled to a network, such as the Internet, and may enable a mobile device to communicate via the network, or to communicate with other devices coupled to the AP. In some examples, the wireless network may be a heterogeneous network in which different types of APs and base stations provide coverage for various geographical regions. For example, the wireless network may support both the WLAN and the Long Term Evolution (LTE) network.

A mobile device may communicate with a wireless network bi-directionally utilizing a WLAN radio or an LTE radio, and the mobile device may make regular measurements to determine which radio provides for better operation. In certain scenarios, however, making such measurements may negatively impact mobile device operation. It may therefore be advantageous to identify conditions in which making measurements may not lead to preferable device operation.

SUMMARY

Systems, methods, and apparatuses for maximizing radio resources in a multi-radio device are described. In accordance with the present disclosure, a mobile device may monitor the signal quality of an established communication associated with a first radio (e.g., LTE radio) to dynamically adapt the scanning operation of a second radio (e.g., WLAN radio) to minimize data transmission interruption.

A method of wireless communication at a mobile device is described. The method may include determining a signal quality for at least one channel for a first radio utilizing a first radio access technology (RAT), comparing the determined signal quality for the first radio with a threshold, and adapting a scan activity of a second radio utilizing a second RAT based in at least in part on the comparison.

An apparatus for wireless communication at a mobile device is also described. The apparatus may include a signal quality detector for determining a signal quality for at least one channel for a first radio utilizing a first RAT, a signal quality comparator for comparing the determined signal quality for the first radio with a threshold, and an adaptive scanner for adapting a scan activity of a second radio utilizing a second RAT based in at least in part on the comparison.

A further apparatus for wireless communication at a mobile device is also described. The apparatus may include means for determining a signal quality for at least one channel for a first radio utilizing a first RAT, means for comparing the determined signal quality for the first radio with a threshold, and means for adapting a scan activity of a second radio utilizing a second RAT based in at least in part on the comparison.

A non-transitory computer-readable medium storing code for wireless communication at a mobile device is also described. The code may include instructions executable to determine a signal quality for at least one channel for a first radio utilizing a first RAT, compare the determined signal quality for the first radio with a threshold, and adapt a scan activity of a second radio utilizing a second RAT based in at least in part on the comparison.

In some examples of the method, apparatuses, or non-transitory computer-readable medium described above, adapting the scan activity of the second radio may include increasing the scan periodicity of the second radio when the signal quality for the first radio is greater than the threshold. Additionally or alternatively, adapting the scan activity of the second radio may include decreasing the scan periodicity of the second radio when the signal quality for the first radio is less than or equal to the threshold.

In some examples of the method, apparatuses, or non-transitory computer-readable medium described above, adapting the scan activity of the second radio may include disabling the second radio when the signal quality for the first radio is above the threshold. Additionally or alternatively, some examples may include features, means, or instructions for interrupting a connection of the first radio based on the determined signal quality for the first radio, and increasing the scan activity of the second radio upon interrupting the connection of the first radio.

Some examples of the method, apparatuses, or non-transitory computer-readable medium described above may further include features, means, or instructions for transmitting a false channel quality report for the second radio based at least in part on the determined signal quality for the first radio, receiving a message from a base station in response to the false channel quality report, and decreasing the scan activity of the second radio based on the received message. Additionally or alternatively, adapting the scan activity may include adapting the scan activity based on at least one of power usage, history of signal quality, or proximity of base station.

In some examples, the first RAT may be an LTE RAT and the second RAT may be a WLAN RAT. Alternatively, the first RAT may be a WLAN RAT and the second RAT may be an LTE RAT.

Some examples of the method, apparatuses, or non-transitory computer-readable medium described above may further include features, means, or instructions for operating the first and second radio within an unlicensed spectrum. The unlicensed spectrum may, for instance, be an Unlicensed Nation Information Infrastructure (U-NII) band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
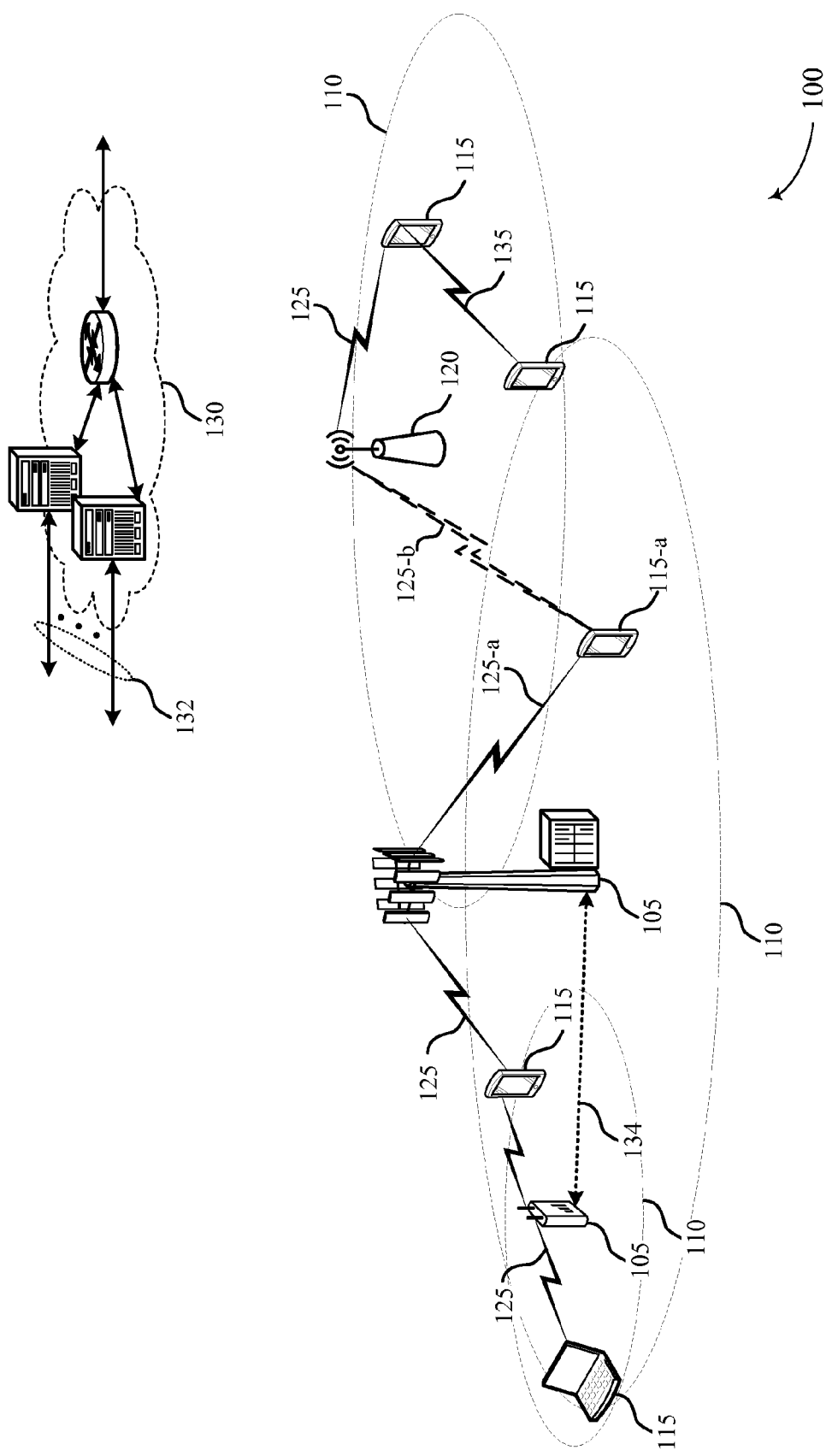
FIG. 1 illustrates an example of a wireless communications system for adapting scanning activity of the first radio based on signal quality of a second radio in accordance with various aspects of the present disclosure.

A mobile device may be equipped with multiple radios that operate independently within a shared frequency band. For example, a mobile device may include a WLAN radio and an LTE/LTE-A radio that may establish communication with a network over a licensed or unlicensed spectrum. In a multi-radio device, each radio may periodically scan a geographical region for an AP or base station that may offer improved transmission resources. In some cases, however, an established data transmission with one radio, e.g., an LTE radio, may be interrupted to support scanning for available resources with another radio, e.g., a WLAN radio.

For instance, a multi-radio device may be actively communicating via LTE, and it may have an LTE signal quality that adequately supports the communication. When the device measures signal quality available to, e.g., a WLAN radio, communication via LTE may be interrupted; and because the LTE signal quality is adequate, the WLAN radio measurement may be superfluous. That is, in some cases, a signal quality for a WLAN radio may not justify ceasing communication with an LTE radio, because the LTE communication link is adequate or preferable. Thus, in accordance with the present disclosure, measurement activity (e.g., scanning activity) of a radio in multi-radio device may be dynamically adapted based on the signal quality of another radio of the device. This may improve network throughput because communication links that are adequate, or preferable, may not be interrupted to perform superfluous measurements.

Adaptive scanning of one of multiple radios that independently operate in the same frequency band is therefore described. As discussed above, a mobile device may include a first radio utilizing a first radio access technology (RAT) and a second radio utilizing a second RAT. In some example, the first and second radios are each a WLAN or an LTE/LTE-A radio operating in licensed or unlicensed spectrum. In other examples the radios may utilize other RATs. Scan activity for one radio of the mobile device may be adapted based on the signal quality, available resources, preferable resources, etc. observed on a different radio of the device.

In accordance with the present disclosure, the mobile device may determine a signal quality of a first radio associated with a first RAT. The signal quality determination may be based on a received signal strength indication (RSSI), signal-to-noise ratio (SNR), or an effective data rate. In some examples, the mobile device may compare the determined signal quality of the first RAT against a predetermined threshold, and adapt (e.g., increase, decrease, or disable) the scanning activity of the second RAT based in part on the comparison.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples. It should further be appreciated that the variable scanning described above is not limited to the WLAN or LTE radios, but may be employed for other radio access technologies.

FIG. 1 illustrates an example of a wireless communications system 100 in accordance with various aspects of the present disclosure. The system 100 includes base stations 105, access points (AP) 120, mobile devices 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X1, etc.), which may be wired or wireless communication links.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 and AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or neither mobile device 115 is within the AP geographic coverage area 110. Examples of direct wireless links 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the system 100.

In some examples, the wireless communications system 100 is an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may be a heterogeneous LTE/LTE-A network in which different types of eNBs provide coverage for various geographical regions. The system 100 may, in some examples, also support a WLAN network. For example, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile device 115 may be dispersed throughout the wireless communications system 100, and each mobile device 115 may be stationary or mobile. A mobile device 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. The mobile devices 115 may be multi-radio devices employing adaptive scanning techniques. For example, a mobile device 115 may dynamically adapt scanning operations of one of its radios (e.g., LTE radio or a WLAN radio), based on a signal quality of another of its radios.

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

The scanning activity of a dual-radio mobile device 115 (e.g., mobile device 115-a) may be adapted based on the signal quality of an established communication link 125-a. Mobile device 115-a may, for example, be located in a strong signal geographic coverage area 110, may establish an active connection 125-a with an eNB 105 over a licensed or unlicensed spectrum utilizing an LTE/LTE-A radio. The mobile device 115-a may determine whether to adapt the scanning activity of the co-located WLAN radio of the mobile device 115-a based on the signal quality of the established communication link 125-a. For instance, the mobile device 115-a may measure the signal quality based on the RSSI, SNR or data rate of the communication link 125-a between the base station 105 and the LTE/LTE-A radio of the mobile device 115-a.

In some examples, the mobile device 115-a may compare the measured signal quality of the communication link 125-a with a signal quality threshold. If the mobile device 115-a determines that the signal quality of communication link 125-a between the LTE/LTE-A radio of the mobile device and the eNB 105 is above the threshold, the mobile device 115-a may reduce the scan activity of the co-located WLAN radio by, for example, increasing the scan periodicity or disabling the WLAN radio. Additionally or alternatively, if the mobile device 115-a determines that the measured signal quality of the communication link 125-a is below the signal quality threshold, the mobile device 115-a may increase the scan activity of the co-located WLAN radio by, for example, decreasing the scan periodicity. It should be appreciated that the adaptive scanning of the present disclosure is not limited to the WLAN radio, but may also be used to adapt the scan activity of the LTE/LTE-A radio as discussed below with reference to FIG. 4.

Figure 2A:
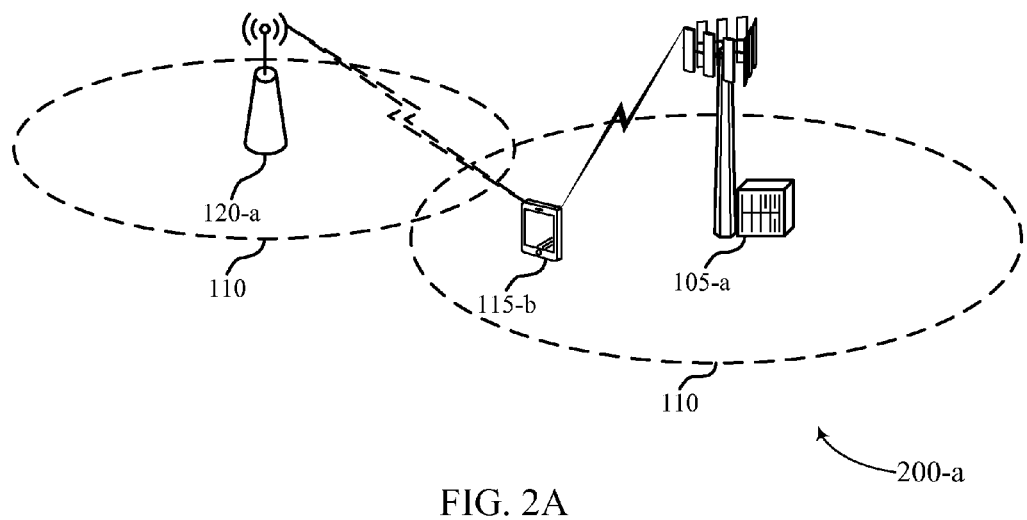
FIGS. 2A and 2B illustrate an example of a wireless communications system for adapting scanning activity of the first radio based on signal quality of a second radio in accordance with various aspects of the present disclosure.
Figure 2B:
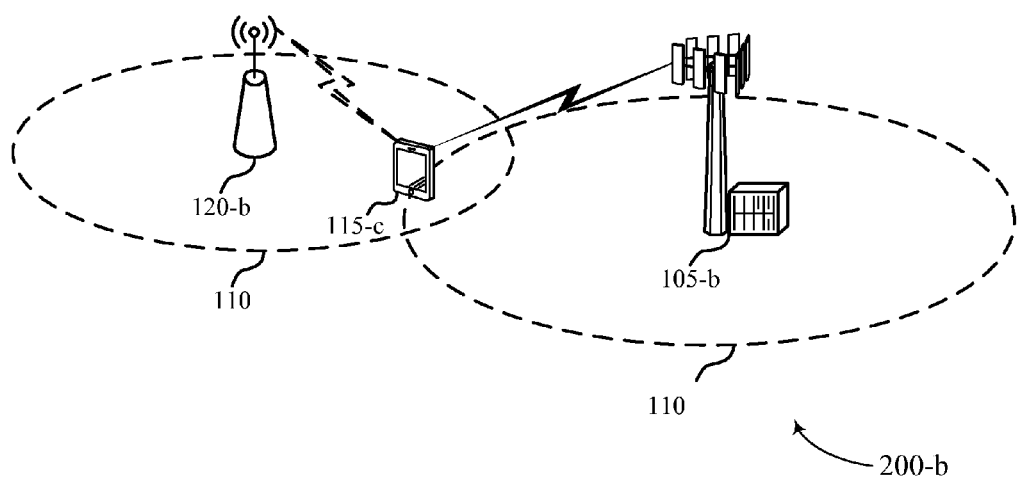

FIG. 2A and FIG. 2B illustrate an example of a wireless communication system 200 for adapting scanning activity of a first radio of a multi-radio device based on signal quality of a second radio of the device, in accordance with various aspects of the present disclosure. Wireless communication system 200 may include a mobile device 115, which may be an example of a mobile device 115 described above with reference to FIG. 1. The system 200 may also include base station 105 and an AP 120, which may be examples of base stations 105 and AP 120 described above with reference to FIG. 1. In some examples, base stations 105 and AP 120 may both operate in a common frequency band, which may include licensed or unlicensed spectrum.

FIG. 2A illustrates an example where the scan activity of a WLAN radio of the mobile device 115-b may be reduced or disabled based on the signal quality of an LTE radio of the mobile device 115-b. In some examples, the mobile device 115-b may establish a connection to a base station 105-a, and the connection may have an adequate signal quality to support the mobile device's 115-b communication requirements (e.g., QoS parameters and the like). In such an instance, the signal quality for a channel for the LTE radio may exceed a predetermined signal quality threshold. Thus, in some examples, the mobile device 115-b may determine that interrupting an active data communication between the mobile device 115-b and base station 105-a over LTE radio may adversely impact the overall performance of the mobile station 115-b. As a result, the mobile device 115-b may reduce the WLAN scan activity by increasing the scan periodicity of the WLAN radio.

Additionally or alternatively, the mobile device 115-b may determine to adapt the scan activity of a radio based on a signal quality comparison of a WLAN radio with the signal quality of the LTE radio. For example, the mobile device 115-b may calculate a first signal quality over the first radio (e.g., WLAN radio) and a second signal quality over the second radio (e.g., LTE radio). In some examples, the mobile device 115-b may compare the first signal quality with the second signal quality, and determine whether the first radio or the second radio offers improved throughput for the mobile device 115-b. Thus, the mobile device 115-b may select the first or the second radio based in part on the determination.

In other examples, the mobile device 115-b may determine that during a previous WLAN scan, the mobile device 115-b was unable to locate an AP 120-a that offered signal quality that exceeds the measured signal quality between the LTE radio of the mobile device 115-b and the base station 105-a. Therefore, in some examples, the mobile device 115-b may dynamically adapt the scan activity of the WLAN radio based on the calculated signal quality of a previous scan.

FIG. 2B illustrates an example where the scan activity of the WLAN radio may be increased based on the signal quality of the LTE radio. The mobile device 115-c may, for example, travel to the edge of the coverage area of the base station 105-b, and thus experience poor channel quality with the base station 105-b over the LTE radio. In such instances, it may be beneficial for the mobile device 115-c to increase scan activity of an WLAN radio in order to locate resources or an AP that may offer improved throughput. In some examples, the mobile device 115-*c* may measure the signal quality (e.g., RSSI, SNR, data rate, etc.) between the LTE radio of the mobile device 115-*c* and the base station 105-*b*. Based on the measured signal quality, the mobile device 115-*c* may determine to dynamically adapt (e.g., increase) the scan activity of the WLAN radio by, for example, decreasing the scan periodicity. As a result, the mobile device 115-*c* may increase the scan frequency of the WLAN radio based on the measured signal quality of the LTE radio co-located at the mobile device 115-*c*.

Figure 3:
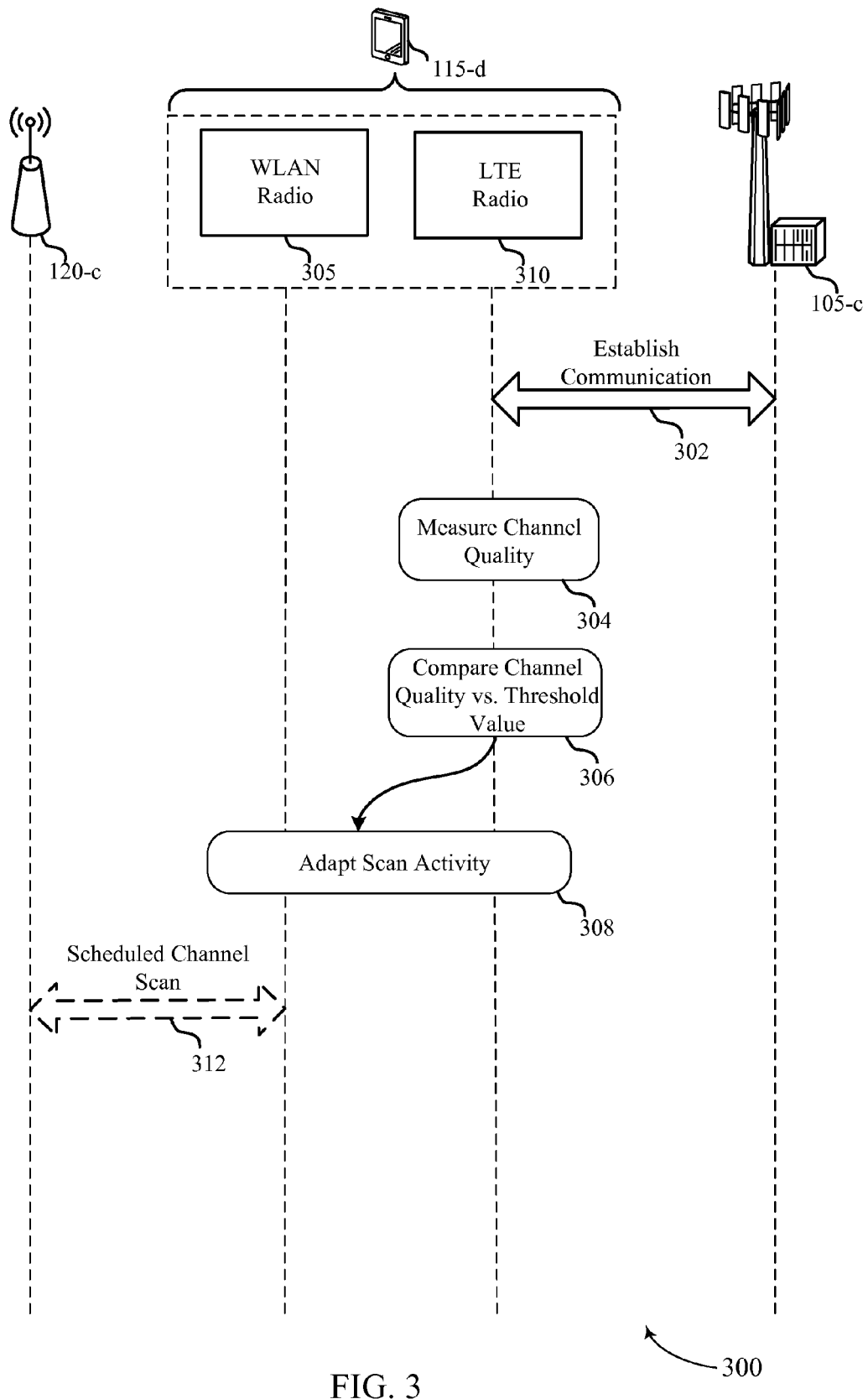
FIG. 3 illustrates an example of a message flow for adapting WLAN scan based on LTE signal quality in accordance with various aspects of the present disclosure.

Turning next to FIG. 3, shown is message flow 300 for adapting scanning activity of a WLAN radio based on signal quality of an LTE radio in accordance with various aspects of the present disclosure. The message flow 300 may be an example of communications between devices of systems 100 or 200 described above with reference to FIG. 1, 2A, or 2B. The base station 105-*c* and AP 120-*c* may be an example of base station 105 and AP 120 described above with reference to the preceding figures. Additionally, mobile device 115-*d* may be an example of a mobile device 115 described above with reference to the preceding figures. The mobile device 115-*d* may include a WLAN radio 305 and an LTE radio 310. In some examples, the WLAN radio 305 and the LTE radio 310 may be controlled by a central processor. Additionally or alternatively, the WLAN radio 305 and the LTE radio 310 may both operate in a common frequency band (e.g., licensed or unlicensed spectrum).

The mobile device 115-*d* may establish a communication 302 with the eNB 105-*c* utilizing an LTE radio 310. Once the mobile device 115-*d* and the eNB 105-*c* have established communication, the mobile device 115-*d* may periodically measure channel quality 304 of the signal between the LTE radio 310 and the eNB 105-*c*. It should be appreciated that any of a number of measurements may be taken to determine the channel quality of the communication link between the LTE radio 310 and the eNB 105-*c*. For example, the channel quality may be based on signal quality measurements, power usage, location of the device in the geographical area, proximity of a base station or AP, historical data, or the like. In some examples, the signal quality may include received signal strength indication, signal-to-noise ratio or data rate.

Following the measurement of the channel quality 304, the mobile device 115-*d* may compare the established channel quality value with a threshold value 306. In various examples, the signal quality threshold may be based on a value, or combination of values measured at block 304. It should further be appreciated that the threshold value may be a static or dynamic value. The mobile device 115-*d* may thus adapt scan activity 308 of WLAN radio 305 based on the channel quality of the co-located LTE radio 310.

In some examples, the channel quality for the LTE radio 310 may exceed a predetermined signal quality threshold. As a result, the mobile device 115-*d* may decrease or disable 312 the scan activity of the WLAN radio 305, which may include increasing the scan periodicity. Alternatively, if the mobile device 115-*d* determines that the signal quality for the LTE radio 310 falls below a threshold, the scanning activity of the WLAN radio 305 may be increased 312, which may include reducing the scan periodicity, and thereby increasing the scan frequency of the WLAN radio 305.

Figure 4:
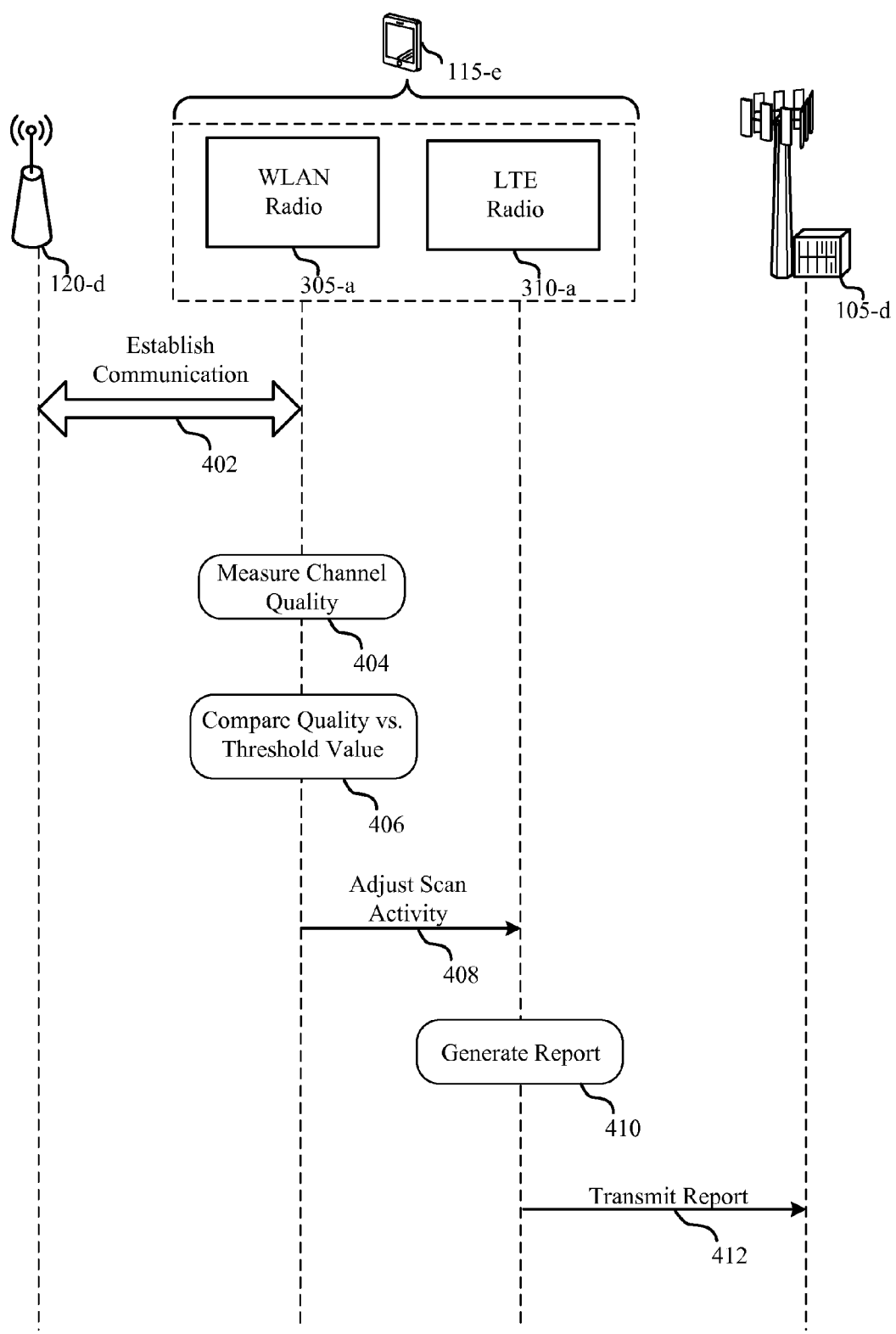
FIG. 4 illustrates an example of a message flow for adapting LTE scan based on WLAN signal quality in accordance with various aspects of the present disclosure.

FIG. 4 illustrates a message flow 400 for adapting scanning activity of the LTE radio based on signal quality of the WLAN radio in accordance with various aspects of the present disclosure. The message flow 400 may be an example of communications between devices of systems 100 or 200 described above with reference to FIG. 1, 2A, or 2B. The base station 105-*d* and AP 120-*d* may be examples of base station 105 and AP 120 described above with reference to the preceding figures. Additionally, mobile device 115-*e* may be an example of a mobile device 115 described above with reference to the preceding figures. The mobile device 115-*e* may include WLAN radio 305-*a* and LTE radio 310-*a*. The WLAN radio 305-*a* and the LTE radio 310-*a* may be examples of WLAN radio 305 and LTE radio 310 described above with reference to FIG. 3. In some examples, the WLAN radio 305-*a* and the LTE radio 310-*a* may communicate bi-directionally or may be controlled by a central processor. Additionally or alternatively, the WLAN radio 305-*a* and the LTE radio 310-*a* may both operate in a common frequency band (e.g., licensed or unlicensed spectrum).

In accordance with the present disclosure, a mobile device 115-*e* may establish communication 402 with the AP 120-*d* utilizing the WLAN radio 305-*a*. Once the mobile device 115-*e* has established active communication with the AP 120-*d*, the mobile device 115-*e* may periodically measure channel quality 404 between the WLAN radio 305-*a* and the AP 120-*d*. It should be appreciated that any number of measurements may be taken to determine the channel quality of the communication link between the WLAN radio 305-*a* and the AP 120-*d*. For example, the channel quality measurements may be based on signal quality, power usage for the radios, location of the device, proximity of base stations/access points, historical data, etc. In some examples, the mobile device 115-*e* may compare 406 the measured channel quality with a predetermined threshold. The threshold value may be static or dynamic value.

The mobile device 115-*e* may determine to adjust the scan activity 408 of the LTE radio 310-*a* based on the calculated comparison of signal quality against a predetermined threshold. But, in some examples, the scanning behavior of the LTE radio 310-*a* may be configured by the eNB 105-*d*. For instance, eNB 105-*d* may configure the LTE radio 310-*a* to periodically scan (e.g., scan for 6 ms every 40 ms) for new resources or base stations 105. The mobile device 115-*e* may therefore adapt the scan activity of the LTE radio 310-*a* by generating a report 410. As a result, if the mobile device 115-*e* determines that the channel quality of the WLAN radio 305-*a* exceeds a predetermined threshold, the mobile device 115-*e* may generate a report 410 that includes a false RSSI or false reference signal receive power (RSRP) levels, in order to induce the eNB 105-*d* to decrease scan activity of the LTE radio. Alternatively, if the mobile device 115-*e* determines that the channel quality of the WLAN radio 305-*a* is below a predetermined threshold, the mobile device 115-*e* may prepare a report 410 identifying proper RSSI or RSRP levels. The mobile device 115-*e* may transmit the report 412 to the eNB 105-*c* based on the determination by the mobile device 115-*e* whether or not to dynamically adjust the scanning activity of the LTE radio 310-*a*.

Figure 5:
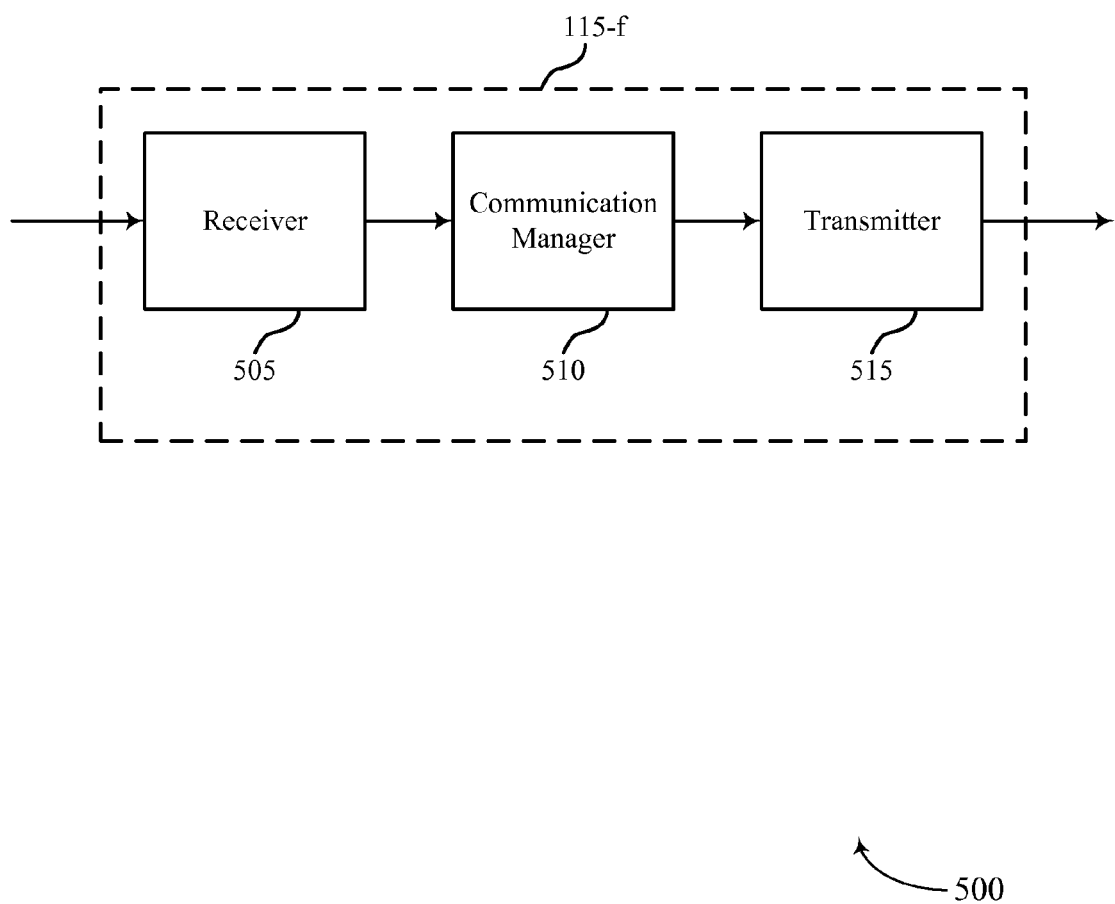
FIG. 5 shows a block diagram of a mobile device for adapting scanning activity of the first radio based on signal quality of a second radio in accordance with various aspects of the present disclosure.

Next, FIG. 5 shows a block diagram 500 of a mobile device 115-*f* for adapting first radio scan activity based on the signal quality of the second radio in accordance with various aspects of the present disclosure. The mobile device 115-*f* may be an example of aspects of a mobile device 115 described with reference to FIGS. 1-4. Mobile device 115-*f* may include a receiver 505, a communication manager 510, and a transmitter 515. Mobile device 115-*f* may also include a processor. Each of these components may be in communication with one another.

The receiver 505 may receive information such as packets, user data, or control information associated with various information channels (e.g., control channels, data channels, and information related to adapting WLAN scan based on LTE signal quality, etc.). Information may be passed on to the communication manager 510, and to other components of UE 115-f. In some examples, the receiver 505 may receive a message from a base station in response to the false channel quality report.

The communication manager 510 may determine a signal quality for a channel for a first radio utilizing a first RAT, compare the determined signal quality for the first radio with a threshold, and adapt a scan activity of a second radio utilizing a second RAT based in at least in part on the comparison.

The transmitter 515 may transmit signals received from other components of UE 115-f. In some examples, the transmitter 515 may be collocated with the receiver 505 in a transceiver module. The transmitter 515 may include a single antenna, or it may include a plurality of antennas.

Figure 6:
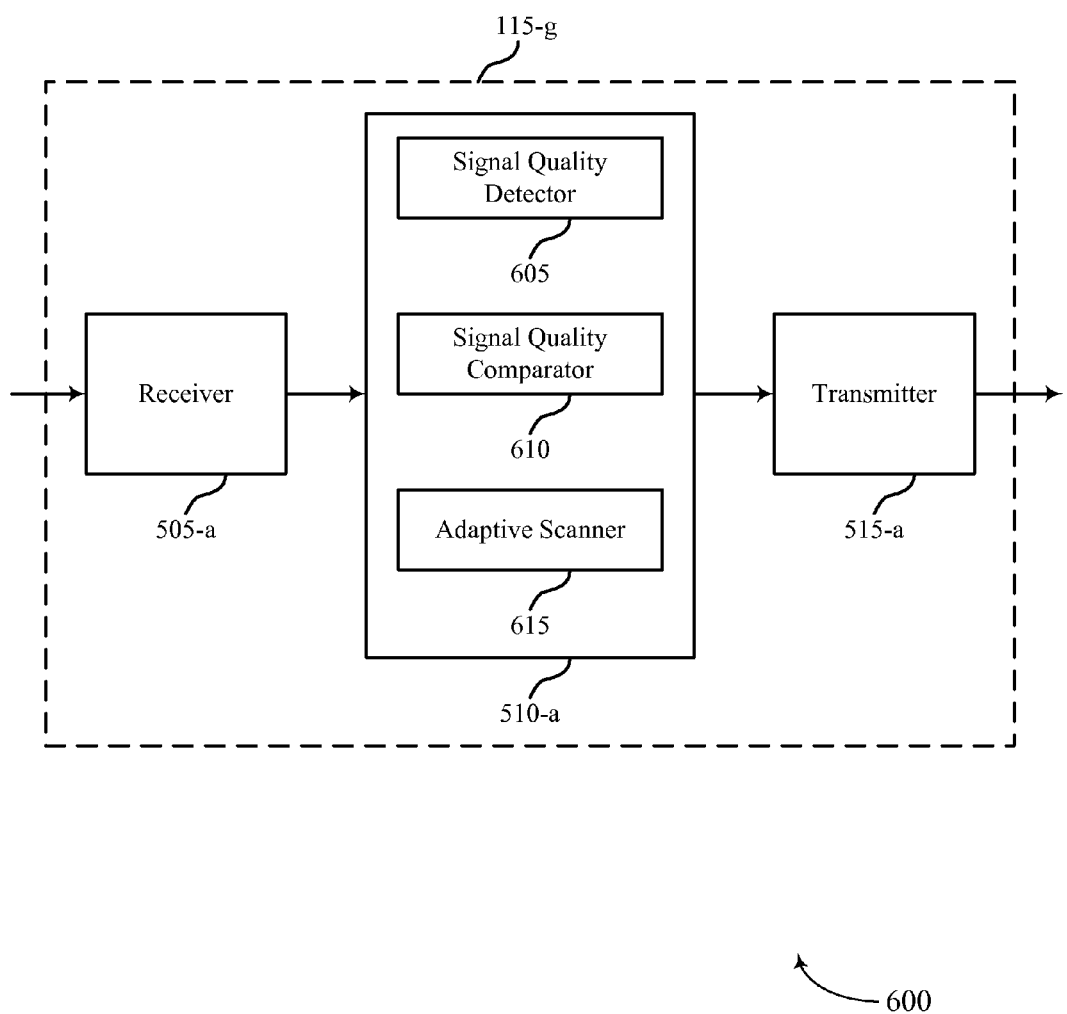
FIG. 6 shows a block diagram of a mobile device for adapting scanning activity of the first radio based on signal quality of a second radio in accordance with various aspects of the present disclosure.

FIG. 6 shows a block diagram 600 of a mobile device 115-g for adapting scan activity of the first radio based on the signal quality of the second radio in accordance with various aspects of the present disclosure. Mobile device 115-g may be an example of aspects of a mobile device 115 described with reference to FIGS. 1-5. Mobile device 115-g may include a receiver 505-a, a communication manager 510-a, or a transmitter 515-a. The mobile device 115-g may also include a processor. Each of these components may be in communication with one another. The communication manager 510-a may also include a signal quality detector 605, a signal quality comparator 610, and an adaptive scanner 615.

The receiver 505-a may receive information which may be passed on to communication manager 510-a, and to other components of mobile device 115-g. The communication manager 510-a may perform the operations described above with reference to FIG. 5. The transmitter 515-a may transmit signals received from other components of mobile device 115-g.

The signal quality detector 605 may determine a signal quality for a channel for a first radio utilizing a first RAT, as described above with reference to FIGS. 2-4. In some examples, the first RAT is an LTE RAT and the second RAT is a WLAN RAT. In other examples, the first RAT comprises a WLAN RAT and the second RAT comprises an LTE RAT. In still other cases, the first or second RATs may be RATs other than LTE and WLAN.

The signal quality comparator 610 may compare the determined signal quality for the first radio with a threshold, as described above with reference to FIGS. 2-4.

The adaptive scanner 615 may adapt a scan activity of a second radio utilizing a second RAT based on the comparison, as described above with reference to FIGS. 2-4. The adaptive scanner 615 may also increase the scan activity of the second radio upon interrupting the connection of the first radio. The adaptive scanner 615 may also decrease the scan activity of the second radio based on the received message. In some examples, adapting the scan activity comprises adapting the scan activity based on power usage, history of signal quality, proximity of base station, any combination thereof or other suitable parameters or measurements.

Figure 7:
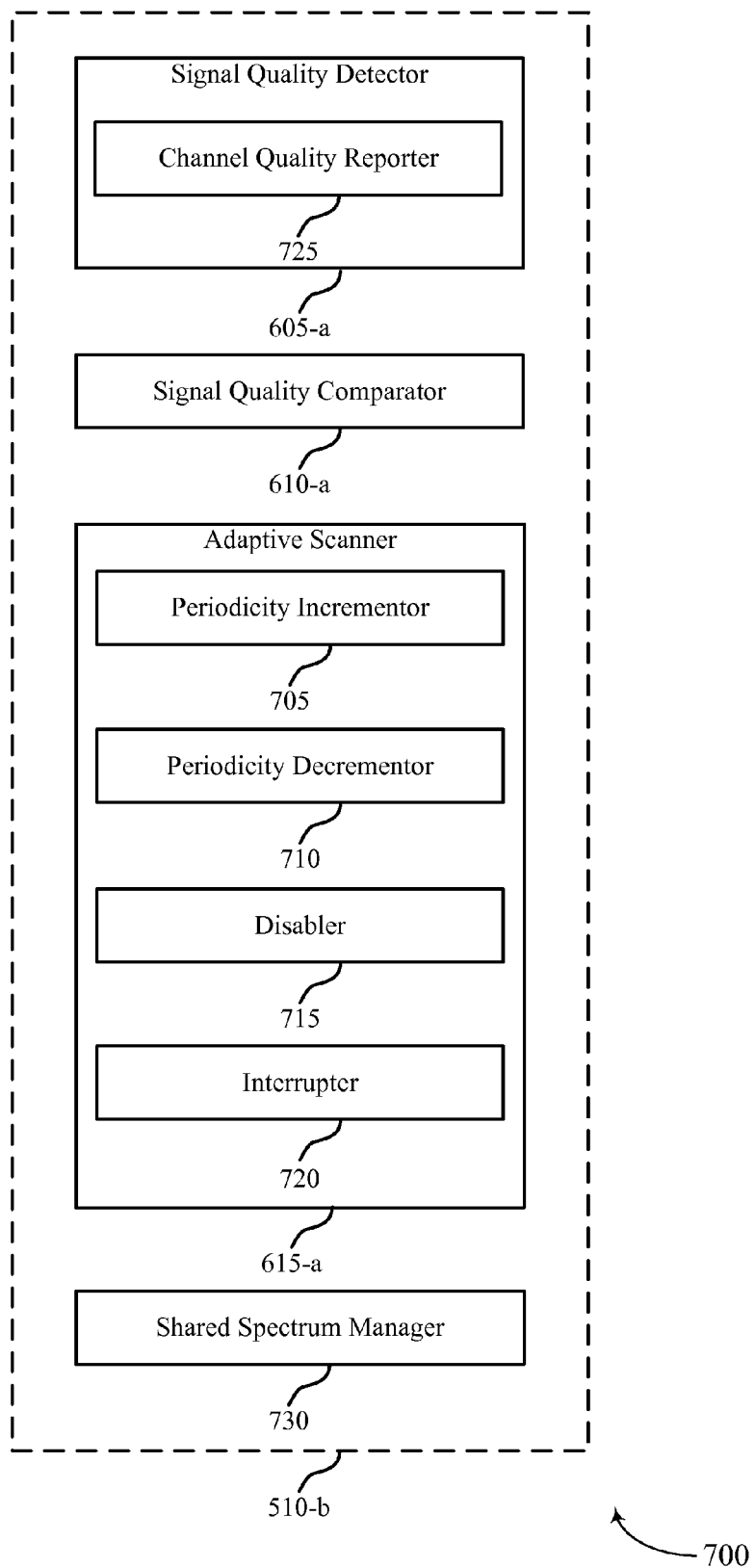
FIG. 7 shows a block diagram of a communication manager for adapting scanning activity of the first radio based on signal quality of a second radio in accordance with various aspects of the present disclosure.

FIG. 7 shows a block diagram 700 of a communication manager 510-b for adapting scan activity of the first radio based on the signal quality of the second radio in accordance with various aspects of the present disclosure. The communication manager 510-b may be an example of aspects of a communication manager 510 described with reference to FIGS. 5-6. The communication manager 510-b may include a signal quality detector 605-a, a signal quality comparator 610-a, and an adaptive scanner 615-a. Each of these components may perform the functions described above with reference to FIG. 6. The communication manager 510-b may also include a periodicity incrementer 705, a periodicity decrementer 710, a disabler 715, an interrupter 720, a channel quality reporter 725, and a shared spectrum manager 730. The various components of communication manager 510-b may be in communication with one another.

The periodicity incrementer 705 may adapt the scan activity of the second radio, which may include increasing the scan periodicity of the second radio when the signal quality for the first radio is greater than the threshold, as described above with reference to FIGS. 2-4. The periodicity decrementer 710 may adapt the scan activity of the second radio, which may include decreasing the scan periodicity of the second radio when the signal quality for the first radio is less than or equal to the threshold, as described above with reference to FIGS. 2-4. In some examples, the disabler 715 may adapt the scan activity of the second radio, which may include disabling the second radio when the signal quality for the first radio is greater than the threshold, as described above with reference to FIGS. 2-4.

The interrupter 720 may interrupt a connection of the first radio based on the determined signal quality for the first radio, as described above with reference to FIGS. 2-4. The channel quality reporter 725 may transmit a false channel quality report for the second radio based on the determined signal quality for the first radio, as described above with reference to FIGS. 2-4.

The shared spectrum manager 730 may operate the first and second radio within an unlicensed spectrum, as described above with reference to FIGS. 2-4. In some examples, the unlicensed spectrum is a U-NII band.

The components of the mobile device 115-f, the mobile device 115-g, or communication manager 510-b may, individually or collectively, be implemented with at least one application-specific integrated circuit (ASIC) adapted to perform some or all of the applicable functions in hardware. Alternatively, the functions may be performed by one or more other processing units (or cores), on at least one integrated circuit (IC). In other embodiments, other types of integrated circuits may be used (e.g., Structured/Platform ASICs, a Field-Programmable Gate Array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
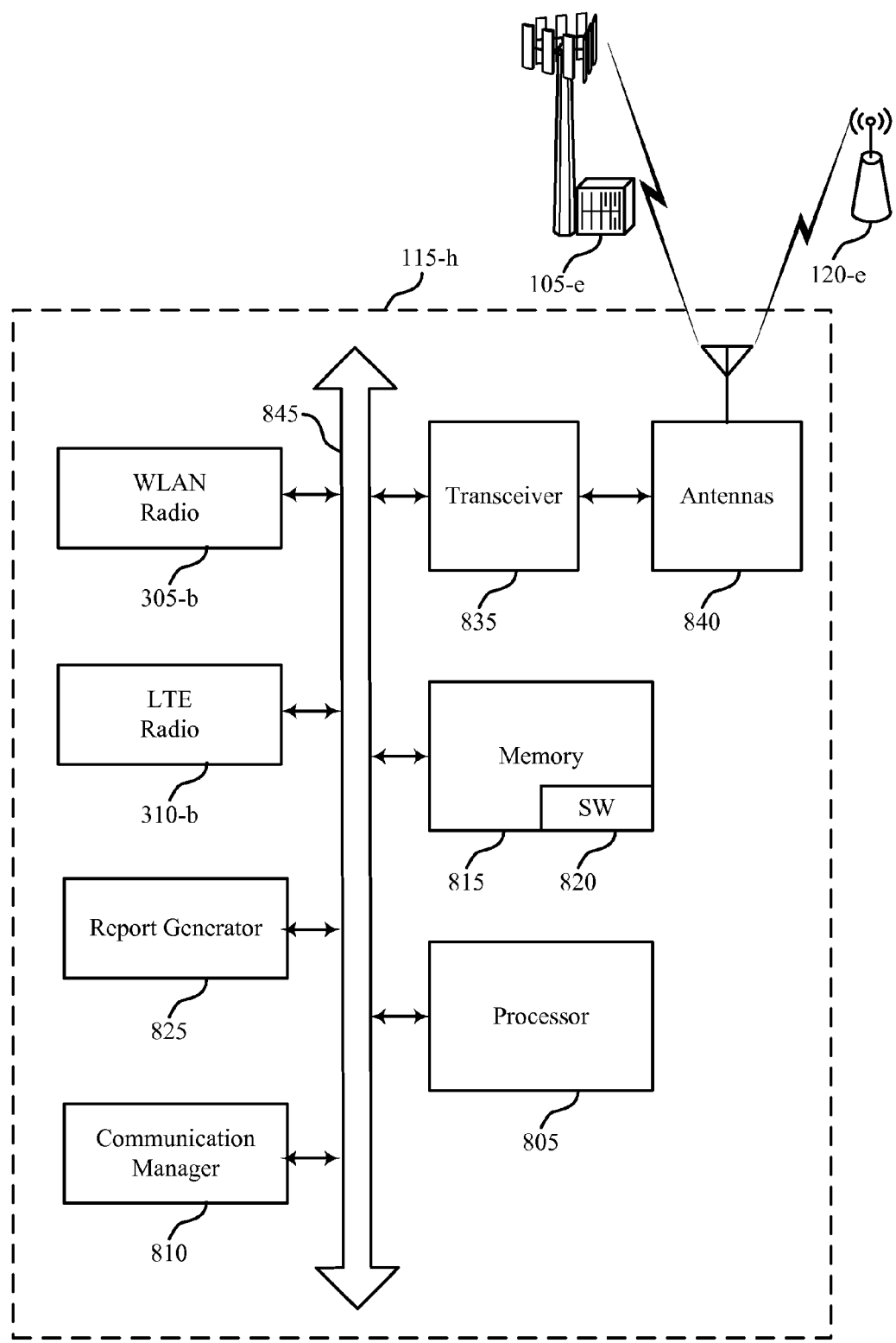
FIG. 8 illustrates a block diagram of a system, including a mobile device, for adapting scanning activity of the first radio based on signal quality of a second radio in accordance with various aspects of the present disclosure.

FIG. 8 shows a diagram of a system 800, including a mobile device 115-h, for adaptive scanning in accordance with various aspects of the present disclosure. The mobile device 115-h may be an example of a mobile device 115 described above with reference to FIGS. 1-7. The mobile device 115-h may include a communication manager 810, which may be an example of a communication manager 510 described with reference to FIGS. 5-7. The mobile device 115-h may also include a WLAN radio 305-b and LTE radio 310-b, which may be examples of WLAN radio 305 and LTE radio 310 described with references to FIGS. 1-4. WLAN radio 305-b and an LTE radio 310-b may manage communications with other network devices, such as base station 105-e and AP 120-e as shown in FIG. 8, via the transceiver 835 and antennas 840.

Mobile device 115-*h* may also include a report generator 825. In some examples, mobile device 115-*h* include components for bi-directional voice and data communications, including components for transmitting communications and components for receiving communications. For example, mobile device 115-*h* may communicate bi-directionally with an AP 120-*e* or base station 105-*e*.

In some examples, the report generator 825 may be configure to generate signal quality reports to transmit to the eNB 105-*e* in order to adjust the scanning behavior of an LTE radio of the mobile device 115-*h*. In some examples, the report generator 825 may generate report comprising a false RSSI or RSRP level(s) to induce the eNB 105-*e* to decrease the scan activity of the LTE radio. Alternatively, the report generator 825 may generate report comprising correct RSSI or RSRP level(s) to induce the eNB 105-*e* to increase the scan activity of the LTE radio when the signal quality of the co-located WLAN radio may be below a predetermined threshold.

Mobile device 115-*h* may also include a processor 805, memory 815 (including software (SW) 820), a transceiver 835, and one or more antenna(s) 840, each of which may communicate, directly or indirectly, with each other (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or AP 120-*e*. The transceiver 835 may include a modem to modulate the packets and provide the modulated packets to the antenna(s) 840 for transmission, and to demodulate packets received from the antenna(s) 840. In some examples, the transceiver 835 is an aspect of the WLAN radio 305-*b* or the LTE radio 310-*b*. While mobile device 115-*h* may include a single antenna 840. In some examples, mobile device 115-*h* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., adapting WLAN scan based on LTE signal quality, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
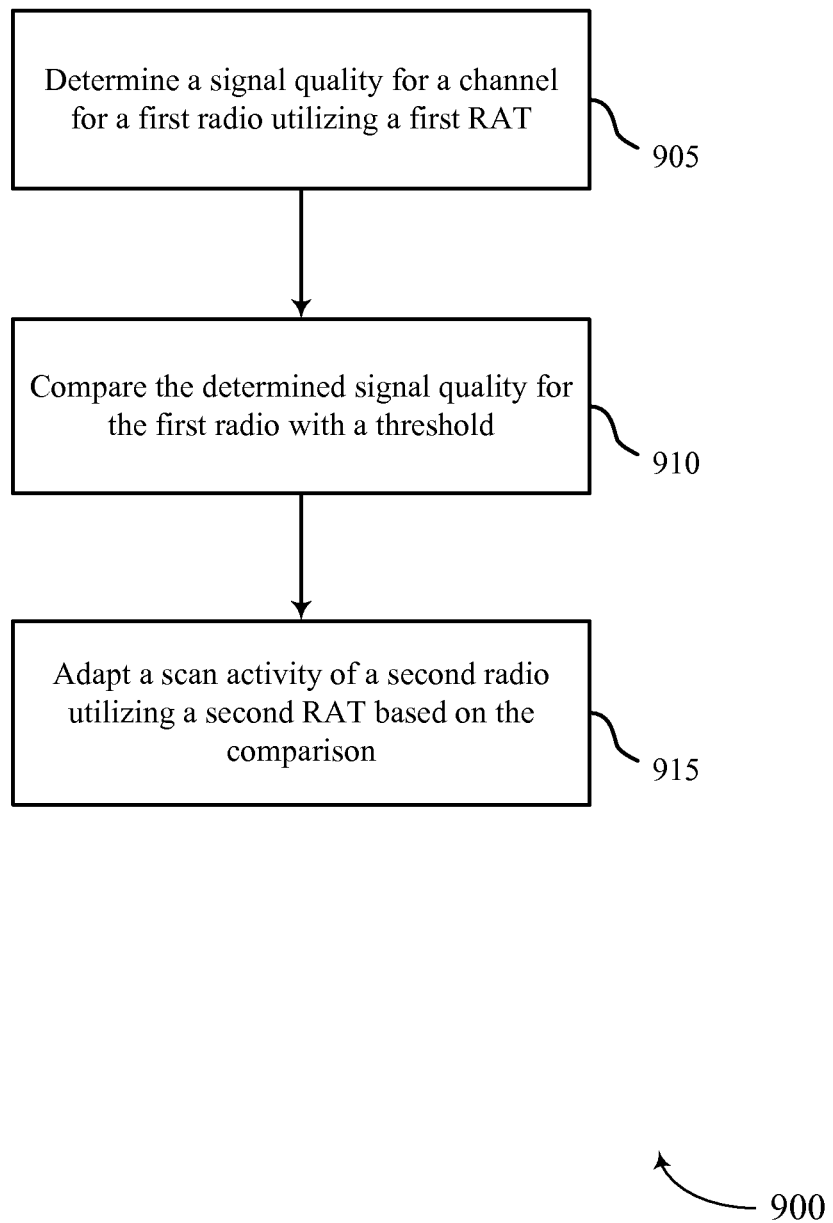
FIG. 9 shows a flowchart illustrating a method for adapting scanning activity of the first radio based on signal quality of a second radio in accordance with various aspects of the present disclosure.

FIG. 9 shows a flowchart illustrating a method 900 for adapting scan activity of the first radio based on the signal quality of the second radio in accordance with various aspects of the present disclosure. The operations of method 900 may be implemented by a mobile device 115 or its components, as described with reference to FIGS. 1-8. For example, the operations of method 900 may be performed by the communication manager 510, as described with reference to FIGS. 5-9. In some examples, a mobile device 115 may execute a set of codes to control the functional elements of the mobile device 115 to perform the functions described below. Additionally or alternatively, the mobile device 115 may perform aspects the functions described below using special-purpose hardware.

At block 905, the mobile device 115 may determine a signal quality for at least one channel for a first radio utilizing a first RAT, as described above with reference to FIGS. 2-4. In certain examples, the operations of block 905 may be performed by the signal quality detector 605, as described above with reference to FIG. 6.

At block 910, the mobile device 115 may compare the determined signal quality for the first radio with a threshold, as described above with reference to FIGS. 2-4. In certain examples, the operations of block 910 may be performed by the signal quality comparator 610, as described above with reference to FIG. 6.

At block 915, the mobile device 115 may adapt a scan activity of a second radio utilizing a second RAT based in at least in part on the comparison as described above with reference to FIGS. 2-4. In certain examples, the operations of block 915 may be performed by the adaptive scanner 615, as described above with reference to FIG. 6.

Figure 10:
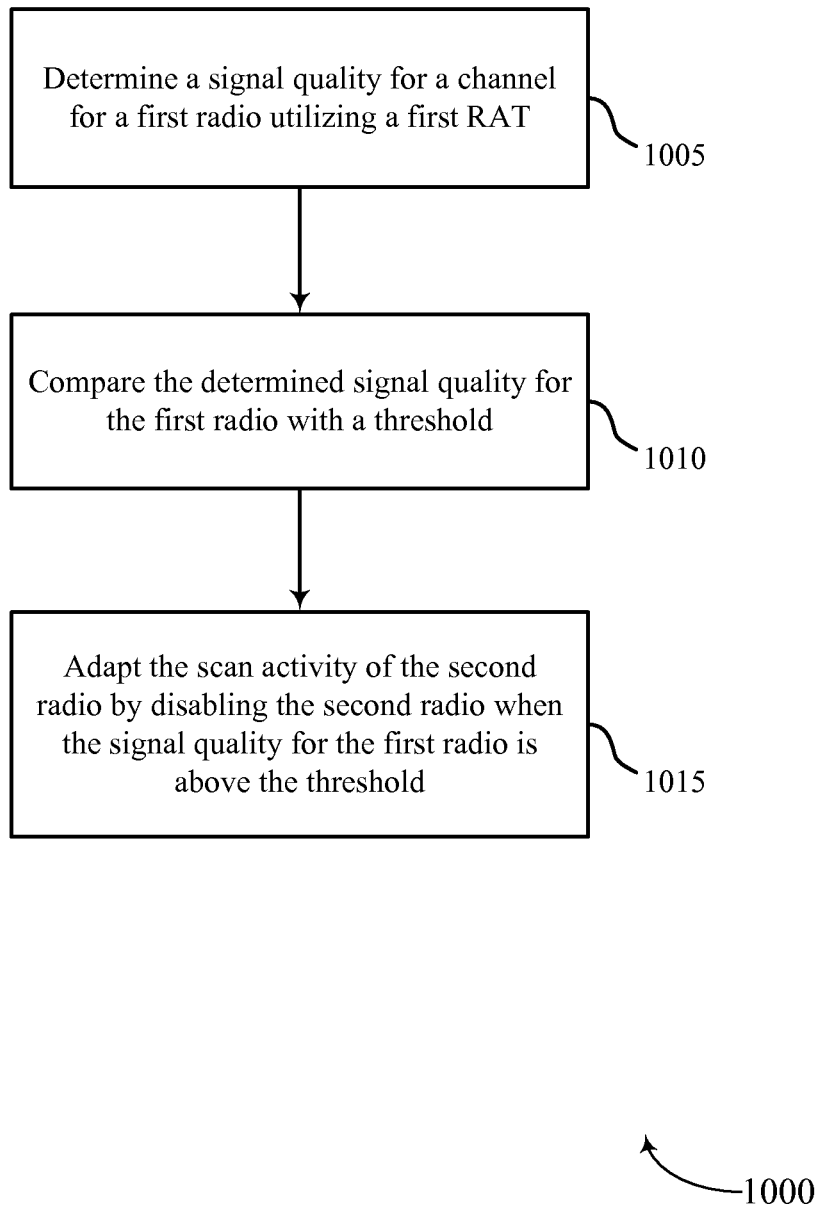
FIG. 10 shows a flowchart illustrating a method for adapting scanning activity of the first radio based on signal quality of a second radio in accordance with various aspects of the present disclosure.

FIG. 10 shows a flowchart illustrating a method 1000 for adapting scan activity of the first radio based on the signal quality of the second radio in accordance with various aspects of the present disclosure. The operations of method 1000 may be implemented by a mobile device 115 or its components, as described with reference to FIGS. 1-8. For example, the operations of method 1000 may be performed by the communication manager 510, as described with reference to FIGS. 5-9. In some examples, a mobile device 115 may execute a set of codes to control the functional elements of the mobile device 115 to perform the functions described below. Additionally or alternatively, the mobile device 115 may perform aspects the functions described below using special-purpose hardware. The method 1000 may also incorporate aspects of method 900 of FIG. 9.

At block 1005, the mobile device 115 may determine a signal quality for at least one channel for a first radio utilizing a first RAT, as described above with reference to FIGS. 2-4. In certain examples, the operations of block 1005 may be performed by the signal quality detector 605, as described above with reference to FIG. 6.

At block 1010, the mobile device 115 may compare the determined signal quality for the first radio with a threshold as described above with reference to FIGS. 2-4. In certain examples, the operations of block 1010 may be performed by the signal quality comparator 610, as described above with reference to FIG. 6.

At block 1015, the mobile device 115 may adapt a scan activity of a second radio utilizing a second RAT based in at least in part on the comparison, as described above with reference to FIGS. 2-4. In some examples, adapting the scan activity of the second radio may comprise disabling the second radio when the signal quality of the first radio is above the threshold, as described above with reference to FIGS. 2-4. In certain examples, the operations of block 1015 may be performed by the adaptive scanner 615 or disabler 715, as described above with reference to FIGS. 6 and 7.

Figure 11:
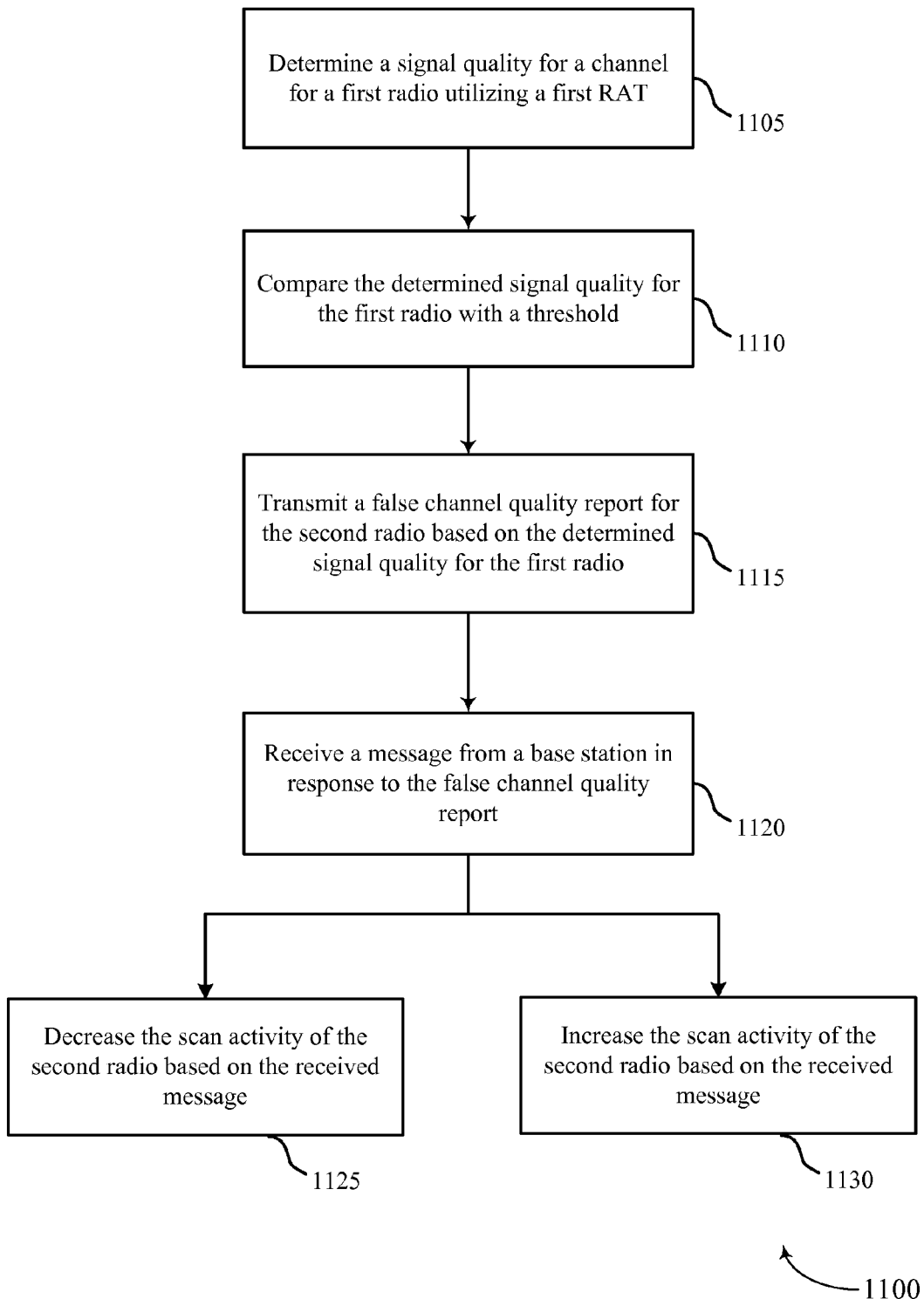
FIG. 11 shows a flowchart illustrating a method for adapting scanning activity of the first radio based on signal quality of a second radio in accordance with various aspects of the present disclosure.

FIG. 11 shows a flowchart illustrating a method 1100 for adapting scan activity of the first radio based on the signal quality of the second radio in accordance with various aspects of the present disclosure. The operations of method 1100 may be implemented by a mobile device 115 or its components, as described with reference to FIGS. 1-8. For example, the operations of method 1100 may be performed by the communication manager 510, as described with reference to FIGS. 5-9. In some examples, a mobile device 115 may execute a set of codes to control the functional elements of the mobile device 115 to perform the functions described below. Additionally or alternatively, the mobile device 115 may perform aspects the functions described below using special-purpose hardware. The method 1100 may also incorporate aspects of methods 900 or 1000 of FIG. 9 or 10.

At block 1105, the mobile device 115 may determine a signal quality for at least one channel for a first radio utilizing a first RAT, as described above with reference to FIGS. 2-4. In certain examples, the operations of block 1105 may be performed by the signal quality detector 605, as described above with reference to FIG. 6.

At block 1110, the mobile device 115 may compare the determined signal quality for the first radio with a threshold, as described above with reference to FIGS. 2-4. In certain examples, the operations of block 1110 may be performed by the signal quality comparator 610, as described above with reference to FIG. 6.

At block 1115, the mobile device 115 may transmit a false channel quality report for the second radio based at least in part on the determined signal quality for the first radio as described above with reference to FIGS. 2-4. In certain examples, the operations of block 1115 may be performed by the channel quality reporter 725, as described above with reference to FIG. 7.

At block 1120, the mobile device 115 may receive a message from a base station in response to the false channel quality report, as described above with reference to FIGS. 2-4. In certain examples, the operations of block 1125 may be performed by the receiver 505, as described above with reference to FIG. 5.

At block 1125, the mobile device 115 may decrease the scan activity of the second radio based on the received message, as described above with reference to FIGS. 2-4. In certain examples, the operations of block 1130 may be performed by the adaptive scanner 615, as described above with reference to FIG. 6.

Alternatively at block 1130, the mobile device 115 may increase the scan activity of the second radio based on the received message, as described above with reference to FIGS. 2-4. In certain examples, the operations of block 1130 may be performed by the adaptive scanner 615, as described above with reference to FIG. 6.

Thus, methods 900, 1000, and 1100 may provide for adaptive scanning for a multi-radio device. It should be noted that methods 900, 1000, and 1100 describe possible implementations, and that the operations and the steps may be rearranged or otherwise modified such that other implementations are possible. In some examples, aspects from two or more of the methods 900, 1000, and 1100 may be combined.

The detailed description set forth above in connection with the appended drawings describes example embodiments and does not represent all the embodiments that may be implemented or that are within the scope of the claims. The term "exemplary," which may be used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a mobile device, comprising:
    determining a signal quality for at least one channel for a first radio utilizing a first radio access technology (RAT) and operating within an unlicensed spectrum;
    comparing the signal quality for the first radio with a threshold;
    performing a plurality of first scans according to a first scan periodicity using a second radio utilizing a second RAT and operating within the unlicensed spectrum, wherein performing the plurality of first scans according to the first scan periodicity periodically interrupts a connection of the first radio according to the first scan periodicity;
    adapting a scan periodicity of the second radio from the first scan periodicity to a second scan periodicity based at least in part on the comparison; and
    performing a plurality of second scans according to the second scan periodicity using the second radio and based at least in part on the adapting, wherein performing the plurality of second scans according to the second scan periodicity periodically interrupts the connection of the first radio according to the second scan periodicity.

2. The method of claim 1, wherein adapting the scan periodicity of the second radio comprises:
    increasing the scan periodicity of the second radio when the signal quality for the first radio is greater than the threshold.

3. The method of claim 1, wherein adapting the scan periodicity of the second radio comprises:
    decreasing the scan periodicity of the second radio when the signal quality for the first radio is less than or equal to the threshold.

4. The method of claim 1, further comprising:
    interrupting the connection of the first radio based at least in part on the signal quality for the first radio; and
    increasing the scan periodicity of the second radio upon interrupting the connection of the first radio.

5. The method of claim 1, further comprising:
    transmitting a false channel quality report for the second radio based at least in part on the signal quality for the first radio;
    receiving a message from a base station in response to the false channel quality report; and
    decreasing the scan periodicity of the second radio based at least in part on the received message.

6. The method of claim 5, further comprising:
    receiving a configuration indicating the first scan periodicity from the base station, wherein the plurality of first scans are performed according to the configuration, and wherein transmitting the false channel quality report is based at least in part on receiving the configuration.

7. The method of claim 1, wherein adapting the scan periodicity comprises:
    adapting the scan periodicity based at least in part on power usage, history of signal quality, proximity of base station, or any combination thereof.

8. The method of claim 1, wherein the first RAT comprises a Long Term Evolution (LTE) RAT and the second RAT comprises a wireless local area network (WLAN) RAT.

9. The method of claim 1, wherein the first RAT comprises a WLAN RAT and the second RAT comprises an LTE RAT.

10. The method of claim 1, wherein the unlicensed spectrum comprises an Unlicensed Nation Information Infrastructure (U-NII) band.

11. An apparatus for wireless communication at a mobile device, comprising:
    a processor;
    memory in electronic communication with the processor;
    a signal quality detector to determine, using the processor and instructions stored in the memory, a signal quality for at least one channel for a first radio utilizing a first radio access technology (RAT) and operating within an unlicensed spectrum;
    a signal quality comparator to compare, using the processor and the instructions stored in the memory, the signal quality for the first radio with a threshold; and
    an adaptive scanner to:
        perform a plurality of first scans according to a first scan periodicity using a second radio utilizing a second RAT and operating within the unlicensed spectrum, wherein performing the plurality of first scans according to the first scan periodicity periodically interrupts a connection of the first radio according to the first scan periodicity;

adapt a scan periodicity of the second radio from the first scan periodicity to a second scan periodicity based at least in part on the comparison; and perform a plurality of second scans according to the second scan periodicity using the second radio and based at least in part on the adaptation, wherein performing the plurality of second scans according to the second scan periodicity periodically interrupts the connection of the first radio according to the second scan periodicity.

12. The apparatus of claim 11, further comprising:
a periodicity incrementer to increase, using the processor and the instructions stored in the memory, the scan periodicity of the second radio when the signal quality for the first radio is greater than the threshold.

13. The apparatus of claim 11, further comprising:
a periodicity decrementer to decrease, using the processor and the instructions stored in the memory, the scan periodicity of the second radio when the signal quality for the first radio is less than or equal to the threshold.

14. The apparatus of claim 11, further comprising:
an interrupter to interrupt, using the processor and the instructions stored in the memory, the connection of the first radio based at least in part on the signal quality for the first radio; and
a periodicity incrementer to increase, using the processor and the instructions stored in the memory, the scan periodicity of the second radio upon interrupting the connection of the first radio.

15. The apparatus of claim 11, further comprising:
a channel quality reporter to transmit, using the processor and the instructions stored in the memory, a false channel quality report for the second radio based at least in part on the signal quality for the first radio;
a receiver to receive, using the processor and the instructions stored in the memory, a message from a base station in response to the false channel quality report; and
a periodicity decrementer to decrease, using the processor and the instructions stored in the memory, the scan periodicity of the second radio based at least in part on the received message.

16. The apparatus of claim 11, wherein the adaptive scanner is configured to:
adapt the scan periodicity based at least in part on power usage, history of signal quality, proximity of base station, or any combination thereof.

17. An apparatus for wireless communication at a mobile device, comprising:
means for determining a signal quality for at least one channel for a first radio utilizing a first radio access technology (RAT) and operating within an unlicensed spectrum;
means for comparing the signal quality for the first radio with a threshold;
means for performing a plurality of first scans according to a first scan periodicity using a second radio utilizing a second RAT and operating within the unlicensed spectrum, wherein performing the plurality of first scans according to the first scan periodicity periodically interrupts a connection of the first radio according to the first scan periodicity;

means for adapting a scan periodicity of the second radio from the first scan periodicity to a second scan periodicity based at least in part on the comparison; and
means for performing a plurality of second scans according to the second scan periodicity using the second radio and based at least in part on the adapting, wherein performing the plurality of second scans according to the second scan periodicity periodically interrupts the connection of the first radio according to the second scan periodicity.

18. The apparatus of claim 17, wherein the means for adapting the scan periodicity of the second radio comprises:
means for increasing the scan periodicity of the second radio when the signal quality for the first radio is greater than the threshold.

19. The apparatus of claim 17, wherein the means for adapting the scan periodicity of the second radio comprises:
means for decreasing the scan periodicity of the second radio when the signal quality for the first radio is less than or equal to the threshold.

20. The apparatus of claim 17, further comprising:
means for interrupting the connection of the first radio based at least in part on the determined signal quality for the first radio; and
means for increasing the scan periodicity of the second radio upon interrupting the connection of the first radio.

21. The apparatus of claim 17, further comprising:
means for transmitting a false channel quality report for the second radio based at least in part on the determined signal quality for the first radio;
means for receiving a message from a base station in response to the false channel quality report; and
means for decreasing the scan periodicity of the second radio based at least in part on the received message.

22. The apparatus of claim 17, wherein the means for adapting the scan periodicity comprises:
means for adapting the scan periodicity based at least in part on power usage, history of signal quality, proximity of base station, or combination thereof.

23. The apparatus of claim 17, wherein the first RAT comprises a Long Term Evolution (LTE) RAT and the second RAT comprises a wireless local area network (WLAN) RAT.

24. The apparatus of claim 17, wherein the first RAT comprises a WLAN RAT and the second RAT comprises an LTE RAT.

25. The apparatus of claim 17, wherein the unlicensed spectrum comprises an Unlicensed Nation Information Infrastructure (U-NII) band.

26. A non-transitory computer-readable medium storing code for wireless communication at a mobile device, the code comprising instructions, when implemented by a processor, executable to:
determine a signal quality for at least one channel for a first radio utilizing a first radio access technology (RAT) and operating within an unlicensed spectrum;
compare the determined signal quality for the first radio with a threshold;
perform a plurality of first scans according to a first scan periodicity using a second radio utilizing a second RAT and operating within the unlicensed spectrum, wherein the plurality of first scans according to the first scan periodicity periodically interrupts a connection of the first radio according to the first scan periodicity;
adapt a scan periodicity of the second radio from the first scan periodicity to a second scan periodicity based at least in part on the comparison; and perform a plurality of second scans according to the second scan periodicity using the second radio and based at least in part on the adaptation, wherein performing the plurality of second scans according to the second scan periodicity periodically interrupts the connection of the first radio according to the second scan periodicity.

* * * * *